United States Patent
Hirano

(10) Patent No.: US 10,957,891 B2
(45) Date of Patent: Mar. 23, 2021

(54) WIRING MODULE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventor: Yuko Hirano, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES. LTD., Osaka (JP)

( * ) Notice: Subject to any disclaimer, the term of this patent is extended or adjusted under 35 U.S.C. 154(b) by 223 days.

(21) Appl. No.: 16/072,773

(22) PCT Filed: Feb. 7, 2017

(86) PCT No.: PCT/JP2017/004316
§ 371 (c)(1),
(2) Date: Jul. 25, 2018

(87) PCT Pub. No.: WO2017/150088
PCT Pub. Date: Sep. 8, 2017

(65) Prior Publication Data
US 2019/0036099 A1    Jan. 31, 2019

(30) Foreign Application Priority Data
Feb. 29, 2016 (JP) .............................. JP2016-036569

(51) Int. Cl.
*H01M 2/20* (2006.01)
*H01M 2/34* (2006.01)
(Continued)

(52) U.S. Cl.
CPC ......... *H01M 2/206* (2013.01); *H01M 2/1077* (2013.01); *H01M 2/20* (2013.01);
(Continued)

(58) Field of Classification Search
CPC ........ H01M 2/348; H01M 2/202; H01M 2/34; H01M 2/1077; H01M 2/206;
(Continued)

(56) References Cited

U.S. PATENT DOCUMENTS

2002/0086578 A1    7/2002  Ikeda
2002/0098734 A1    7/2002  Ikeda
(Continued)

FOREIGN PATENT DOCUMENTS

JP    2000-123802    4/2000
JP    2013-097962    5/2013
(Continued)

OTHER PUBLICATIONS

Official Communication issued in International Bureau of WIPO Patent Application No. PCT/JP2017/004316, dated Apr. 25, 2017.

*Primary Examiner* — Bryan R Perez
(74) *Attorney, Agent, or Firm* — Greenblum & Bernstein, P.L.C.

(57) ABSTRACT

A wiring module includes a plurality of bus bars for connection to positive and negative electrode terminals of a plurality of electricity storage elements; a plurality of detection wires electrically connected the bus bars to detect a state of the electricity storage elements; a plurality of overcurrent protection elements connected between the plurality of bus bars and the plurality of detection wires; and an insulating protector in which the plurality of bus bars, the plurality of detection wires, and the plurality of overcurrent protection elements are disposed, wherein the insulating protector includes a bus bar arrangement portion in which the bus bars
(Continued)

are disposed, and a plurality of extension portions which are extended to a region different from the bus bar arrangement portion and in which the overcurrent protection elements are disposed, and the plurality of extension portions are stacked in a plurality of levels.

4 Claims, 17 Drawing Sheets

(51) Int. Cl.
    *H01M 2/10*     (2006.01)
    *H01M 10/42*     (2006.01)
    *H01M 10/48*     (2006.01)

(52) U.S. Cl.
    CPC ......... *H01M 2/34* (2013.01); *H01M 10/4207* (2013.01); *H01M 10/482* (2013.01); *H01M 2220/20* (2013.01)

(58) Field of Classification Search
CPC ............. H01M 10/425; H01M 10/482; H01M 2220/20; Y02E 60/12
See application file for complete search history.

(56) References Cited

U.S. PATENT DOCUMENTS

| | | |
|---|---|---|
| 2013/0288530 A1 | 10/2013 | Zhao |
| 2014/0335378 A1* | 11/2014 | Kuroda ............... H01M 10/486 |
| | | 429/7 |
| 2017/0062881 A1 | 3/2017 | Kuboki et al. |

FOREIGN PATENT DOCUMENTS

| | | |
|---|---|---|
| JP | 2015-507819 | 3/2015 |
| JP | 2015-204281 | 11/2015 |
| WO | 2015/170646 | 11/2015 |

\* cited by examiner

WIRING MODULE

TECHNICAL FIELD

A technique relating to a wiring module is disclosed herein.

BACKGROUND ART

Conventionally, an electricity storage module configured by arranging a plurality of electricity storage elements is mounted to a vehicle such as an electric car or a hybrid car. A wiring module that houses bus bars therein is mounted to the electricity storage module, and adjacent electrode terminals of the plurality of electricity storage elements are connected by the bus bars, and, thereby, the plurality of electricity storage elements are connected in series or parallel. In the battery wiring module of Patent Document 1, a voltage detection terminal is overlapped with each bus bar, and a detection wire connected to the voltage detection terminal is routed on a resin protector, and is connected to an external ECU.

CITATION LIST

Patent Document

Patent Document 1: JP 2013-97962A

SUMMARY OF INVENTION

Technical Problem

Meanwhile, it is conceivable that an overcurrent protection element that restricts flow of overcurrent is connected to the detection wire for being connected to the voltage detection terminal. In this case, if the overcurrent protection element is disposed on a plane of the resin protector, the area on the plane of the resin protector will be increased in order to ensure the space for the overcurrent protection element, which is contradictory to the need for the size reduction of the wiring module.

The technique disclosed herein has been completed based on the above-described circumstances, and an object thereof is to reduce the size of a wiring module including an overcurrent protection element.

Solution to Problem

A wiring module described herein includes a plurality of bus bars for connection to positive and negative electrode terminals of a plurality of electricity storage elements; a plurality of detection wires electrically connected the bus bars to detect a state of the electricity storage elements; a plurality of overcurrent protection elements connected between the plurality of bus bars and the plurality of detection wires; and an insulating protector in which the plurality of bus bars, the plurality of detection wires, and the plurality of overcurrent protection elements are disposed, wherein the insulating protector includes a bus bar arrangement portion in which the bus bars are disposed, and a plurality of extension portions which are extended to a region different from the bus bar arrangement portion and in which the overcurrent protection elements are disposed, and the plurality of extension portions are stacked in a plurality of levels.

With this configuration, the plurality of overcurrent protection elements are disposed in the plurality of extension portions stacked in a plurality of levels. Accordingly, it is possible to reduce the area of the insulating protector on the same plane as compared with a configuration in which all the overcurrent protection elements are disposed on the same plane of the insulating protector. Consequently, even when the space on the plane is limited, for example, in a vehicle or the like, an extra space in the height direction (the direction orthogonal to the plane) can be effectively used to place the insulating protector. Since the area in which the insulating protector is disposed is reduced in this manner, it is possible to reduce the size of the wiring module.

The following embodiments are preferable as embodiments of the technique described herein.

The overcurrent protection elements are connected in a direction inclined relative to a direction orthogonal to a direction in which the bus bars connect the electrode terminals to each other.

With this configuration, it is possible to reduce the dimension of the insulating protector for the direction orthogonal to the direction in which the bus bars connect the electrode terminals to each other, as compared with a configuration in which the overcurrent protection elements are connected in the direction orthogonal to the direction in which the bus bars connect the electrode terminals to each other. Accordingly, it is possible to reduce the size of the wiring module.

The bus bars each include an inter-electrode conducting portion that electrically connects the electrode terminals to each other, and a connection portion for being connected to the corresponding overcurrent protection element, and the connection portion extends in the direction inclined relative to the direction orthogonal to the direction in which the connection portion connects the electrode terminals to each other.

With this configuration, it is possible to easily perform connection between the bus bar and the overcurrent protection element.

The insulating protector is configured by combining a first unit and a second unit each including the bus bar arrangement portion and the corresponding extension portion.

With this configuration, the insulating protector can be easily produced by forming the insulating protector by combining the first unit and the second unit.

The insulating protector includes a plurality of the bus bar arrangement portions in different regions, and the extension portions are disposed in a region between the plurality of bus bar arrangement portions.

Advantageous Effects of Invention

With the technique described herein, it is possible to reduce the size of a wiring module including an overcurrent protection element.

DESCRIPTION OF EMBODIMENTS

Embodiment 1 will be described with reference to FIGS. 1 to 14.

A wiring module 20 according to the present embodiment is mounted to an electricity storage element group in which a plurality of electricity storage elements 11 are lined up, and thus constitutes an electricity storage module 10. The electricity storage module 10 is mounted to a vehicle such as an electric car or a hybrid car for use as a power supply for driving the vehicle. Although the wiring module 20 may be disposed in any orientation, the following description assumes that an X direction is points leftward, a Y direction points frontward, and a Z direction points upward.

Electricity Storage Module 10

Figure 1:
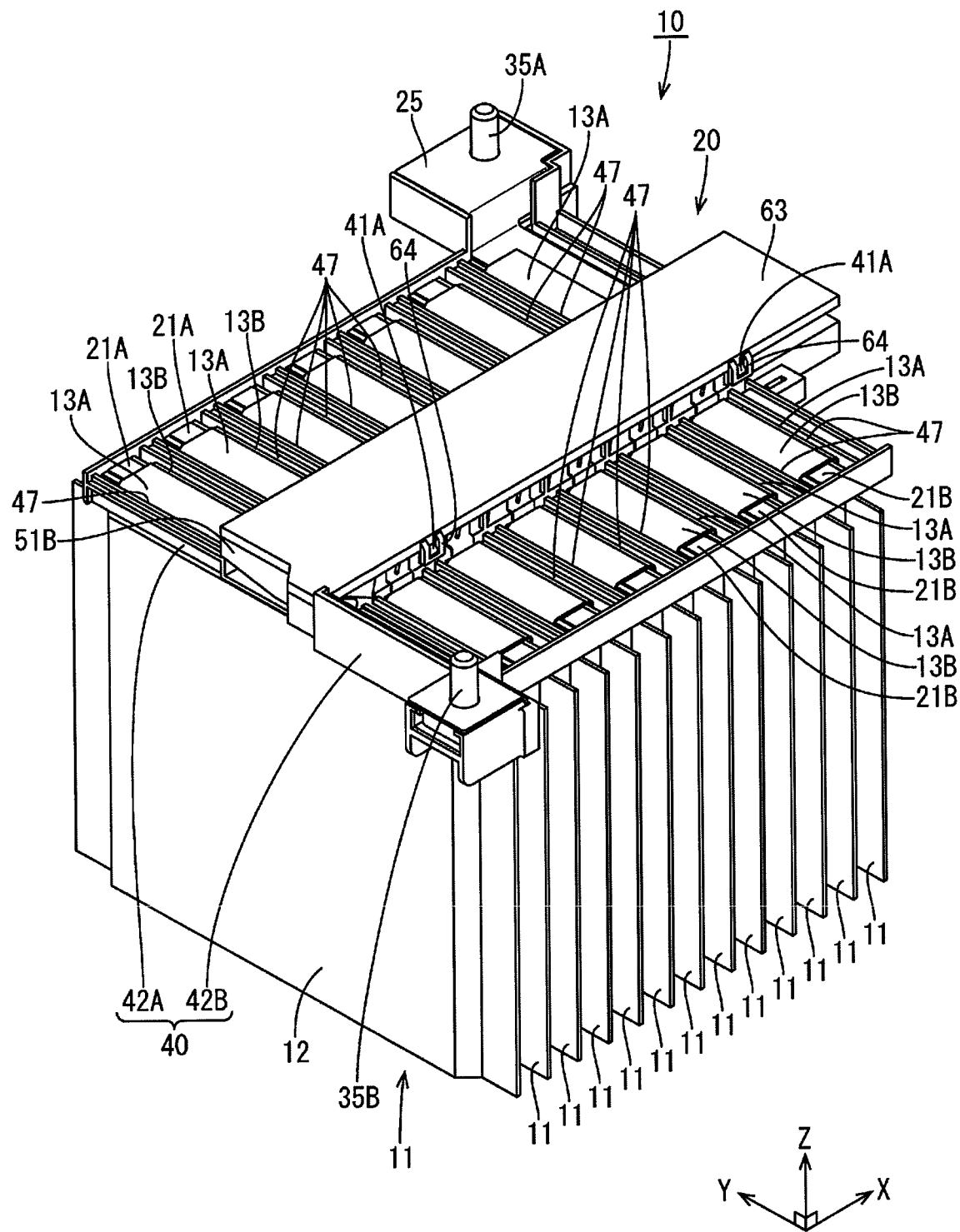
FIG. 1 is a perspective view showing an electricity storage module according to Embodiment 1.

As shown in FIG. 1, the electricity storage module 10 includes a plurality of (in the present embodiment, 13) electricity storage elements 11 arranged in a line, and a wiring module 20 that is attached to the plurality of electricity storage elements 11. Each of the electricity storage elements 11 includes a flat, rectangular solid-shaped body portion 12 in which an electricity storage element (not shown) is housed, and electrode terminals 13A and 13B (a positive electrode shown as 13A and a negative electrode as shown as 13B) protruding from one face of the body portion 12.

Each of the electrode terminals 13A and 13B has flexibility that allows bending deformation. The electrode terminals 13A and 13B are inserted through terminal insertion holes 47 of the wiring module 20, and are bent in an L-shape in a direction in which the distal end sides of the electrode terminals 13A and 13B face each other and are overlapped with the bus bars 21A and 21B. Then, the electrode terminals 13A and 13B and the bus bars 21A and 21B that are overalapped are fixed to each other by welding or the like. Adjacent electricity storage elements 11 are disposed in an orientation in which adjacent electrode terminals 13A and 13B have opposite polarities. Accordingly, the plurality of electricity storage elements 11 are connected in series by connecting the electrode terminals 13A and 13B to each other. The electrode terminals 13A and 13B located at ends of the serial connection are connected to an external device such as an inverter via a wire (not shown).

Wiring Module 20

Figure 2:
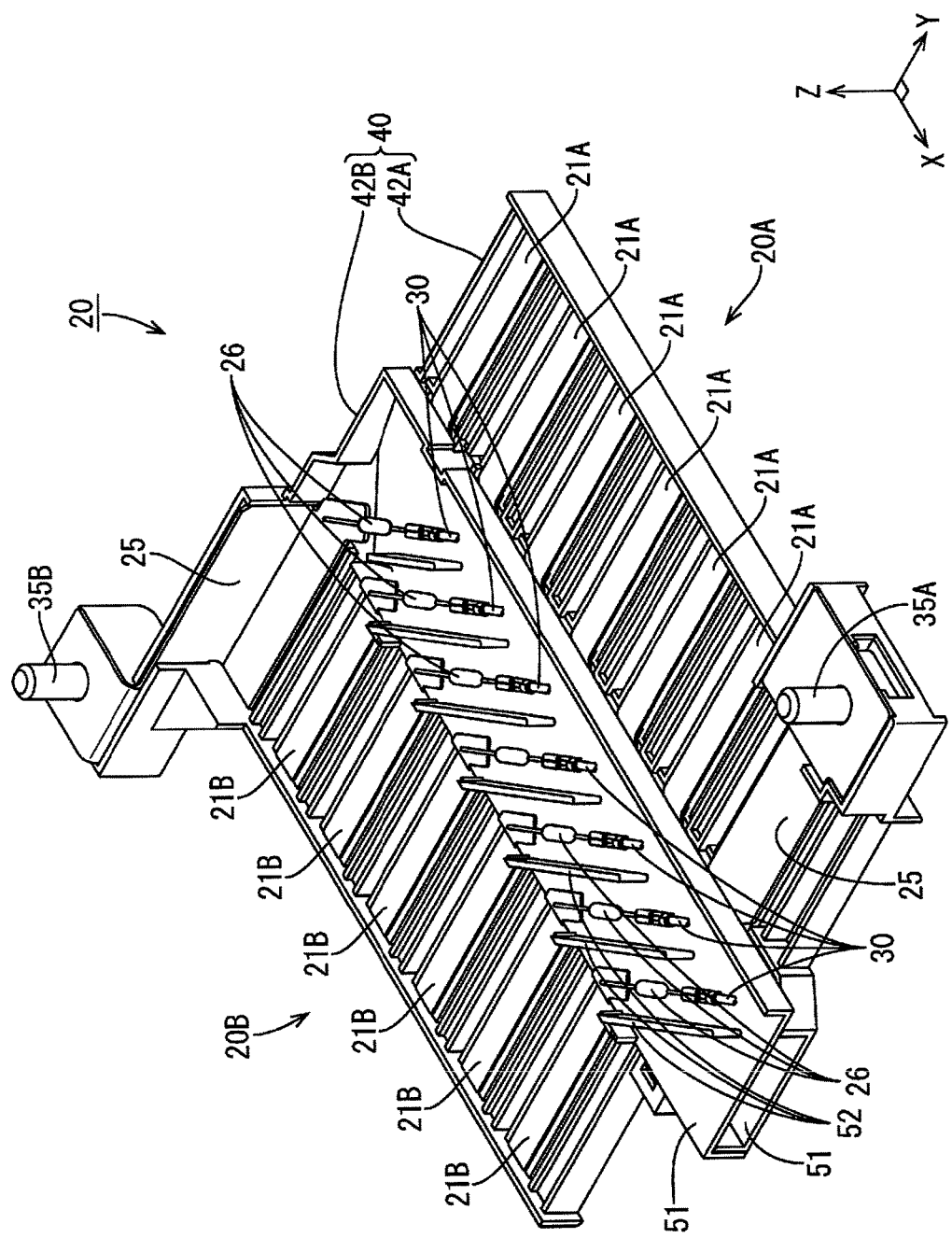
FIG. 2 is a perspective view showing a wiring module with a cover removed.
Figure 3:
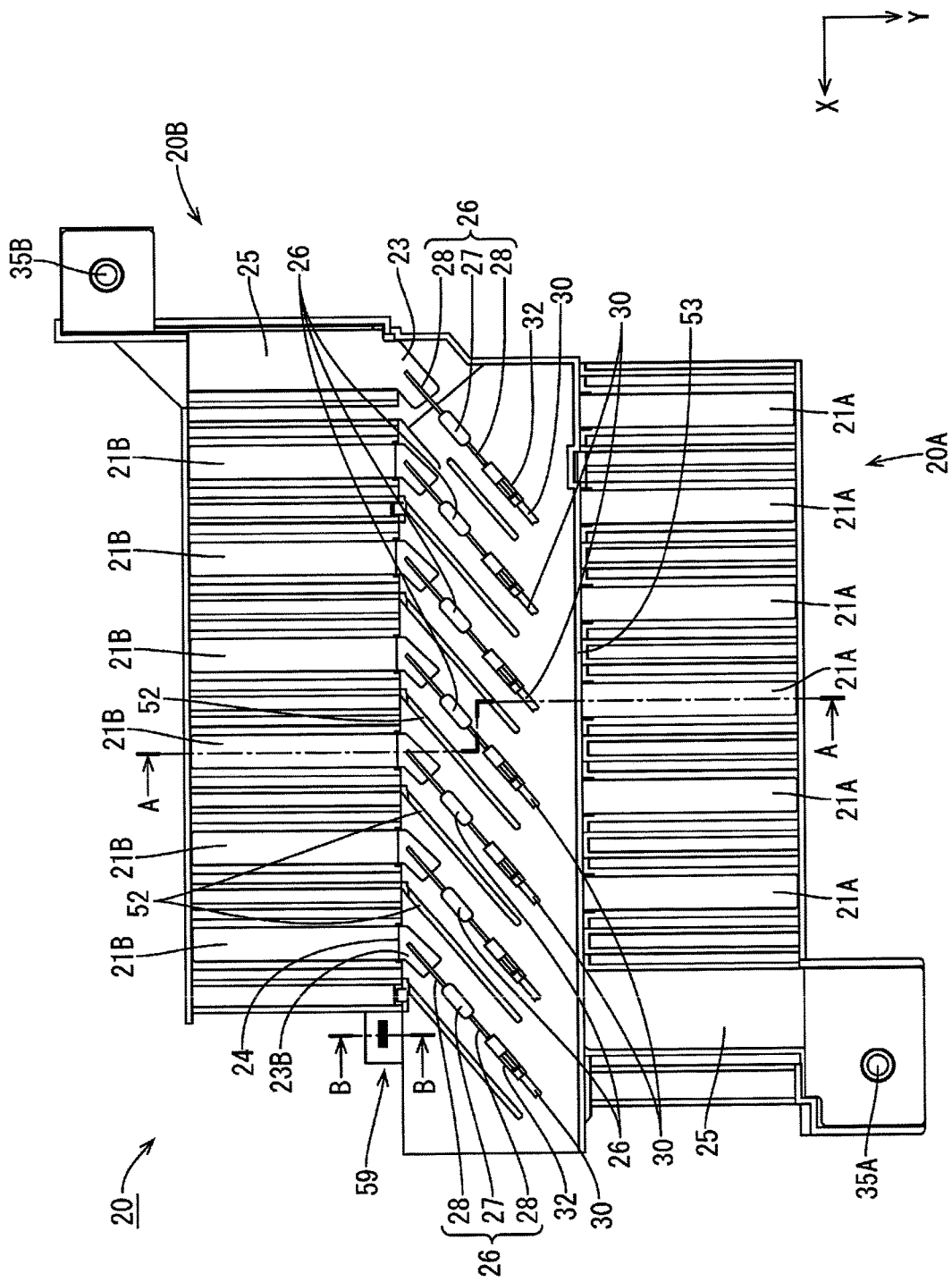
FIG. 3 is a plan view showing the wiring module with the cover removed.
Figure 4:
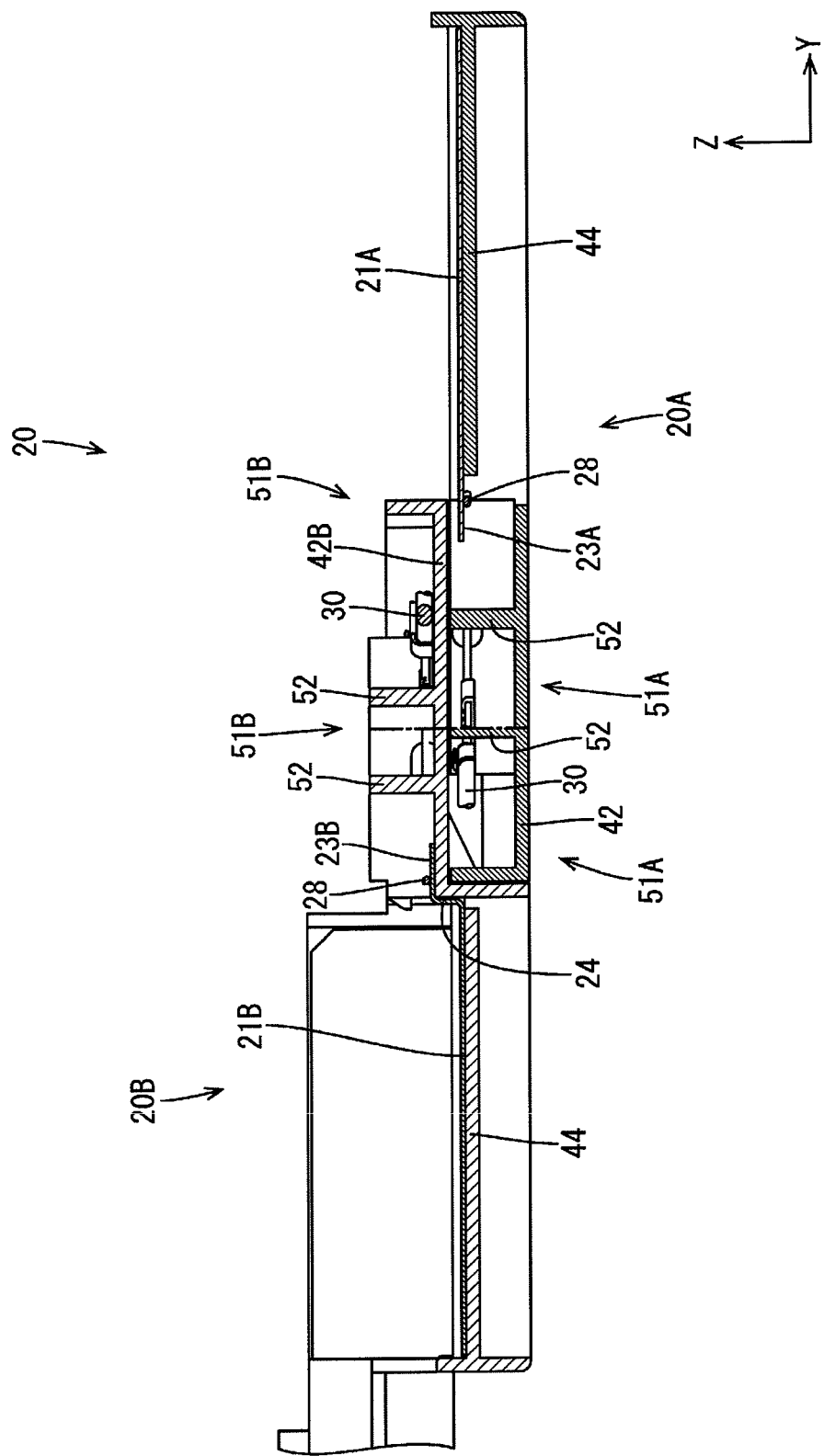
FIG. 4 is a cross-sectional view taken along the line A-A in FIG. 3.

As shown in FIGS. 2 and 3, the wiring module 20 includes: a plurality of bus bars 21A and 21B; a plurality of overcurrent protection elements 26, one lead portion 28 of each of which is connected to the bus bar 21A or 21B; a plurality of detection wires 30, each of which is electrically connected to the other lead portion 28 of the corresponding overcurrent protection element 26; and an insulating protector 40 in which the plurality of bus bars 21A and 21B, the plurality of detection wires 30, and the plurality of overcurrent protection elements 26 are disposed. The wiring module 20 is configured by combining a first divided wiring module 20A including a plurality of bus bars 21A, and a second divided wiring module 20B including a plurality of bus bars 21B.

Bus Bars 21A and 21B

Figure 7:
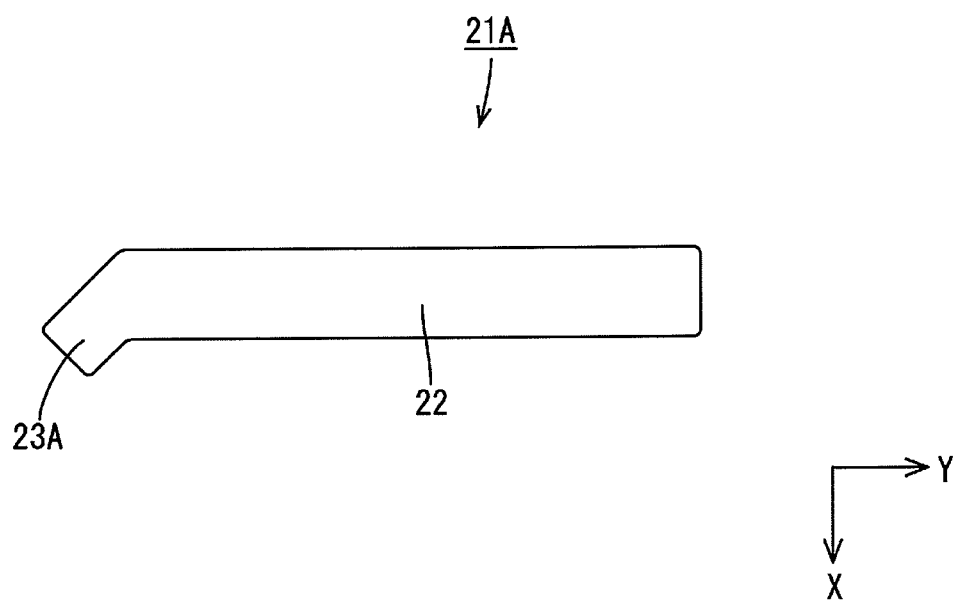
FIG. 7 is a plan view showing a first bus bar.
Figure 8:
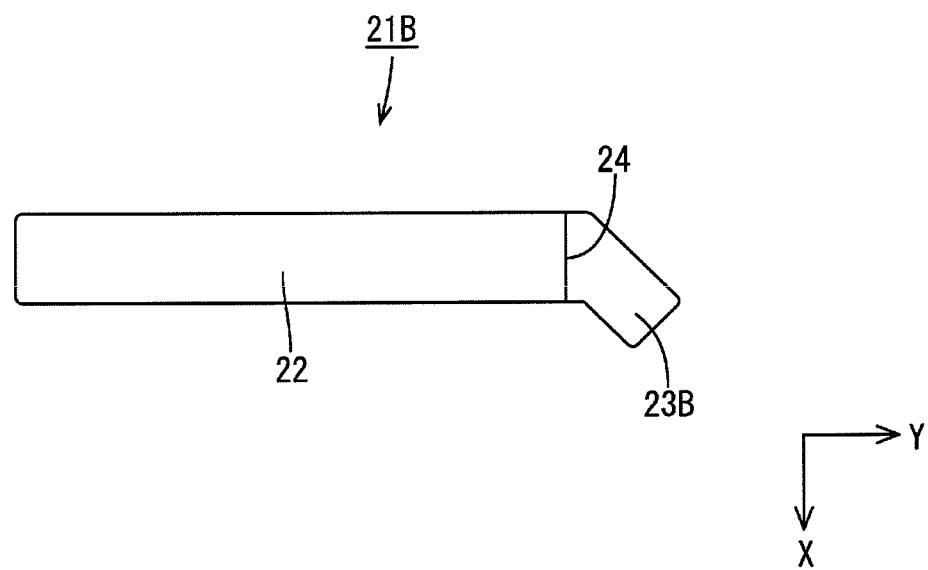
FIG. 8 is a plan view showing a second bus bar.
Figure 9:
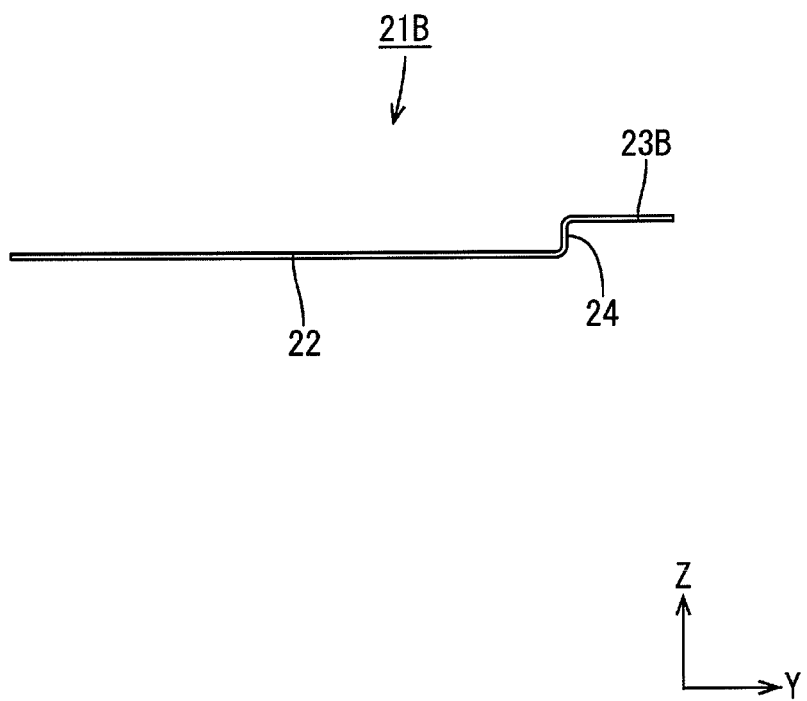
FIG. 9 is a left side view showing the second bus bar.

The plurality of bus bars 21A and 21B each have a plate shape, and include first bus bars 21A provided in the first divided wiring module 20A, and second bus bars 21B provided in the second divided wiring module 20B. As shown in FIG. 7, each first bus bar 21A includes an electrode-connecting conducting portion 22 that connects the electrode terminals 13A and 13B to each other, and a connection portion 23A that is extended to the overcurrent protection element 26 side and is to be connected to the corresponding overcurrent protection element 26. As shown in FIGS. 8 and 9, each second bus bar 21B includes an inter-electrode conducting portion 22 that connects the electrode terminals 13A and 13B to each other, and a connection portion 23B that is extended to the overcurrent protection element 26 side and is to be connected to the corresponding overcurrent protection element 26.

The inter-electrode conducting portion 22 has a rectangular shape that is elongated in a direction (Y direction) orthogonal to the connection direction (X direction) of the electrode terminals 13A and 13B. The connection portions 23A and 23B extend (i.e., their paths are bent) in a direction inclined relative to the direction (Y direction) orthogonal to the connection direction of the electrode terminals 13A and 13B. More specifically, the connection portions 23A and 23B extend in a direction that is bent at an angle of approximately 45 degrees relative to the direction (Y direction) orthogonal to the connection direction of the electrode terminals 13A and 13B. The inter-electrode conducting portion 22 and the connection portion 23A of the first bus bar 21A are formed to be flush with each other, whereas the connection portion 23B of the second bus bar 21B extends parallel at a different height from the inter-electrode conducting portion 22, and a stepped portion 24 is formed between the inter-electrode conducting portion 22 and the connection portion 23B.

As shown in FIGS. 1 and 2, the electrode terminals 13A and 13B located at ends of the serial connection are connected to external connection terminals 35A and 35B via a relay bus bar 25. The relay bus bar 25 has a plate shape, and is formed to have a width larger than that of the bus bars 21A and 21B. The head portions of the external connection terminals 35A and 35B are fixed to the insulating protector 40 or the relay bus bar 25 by press-fitting or the like.

Overcurrent Protection Element 26

Figure 12:
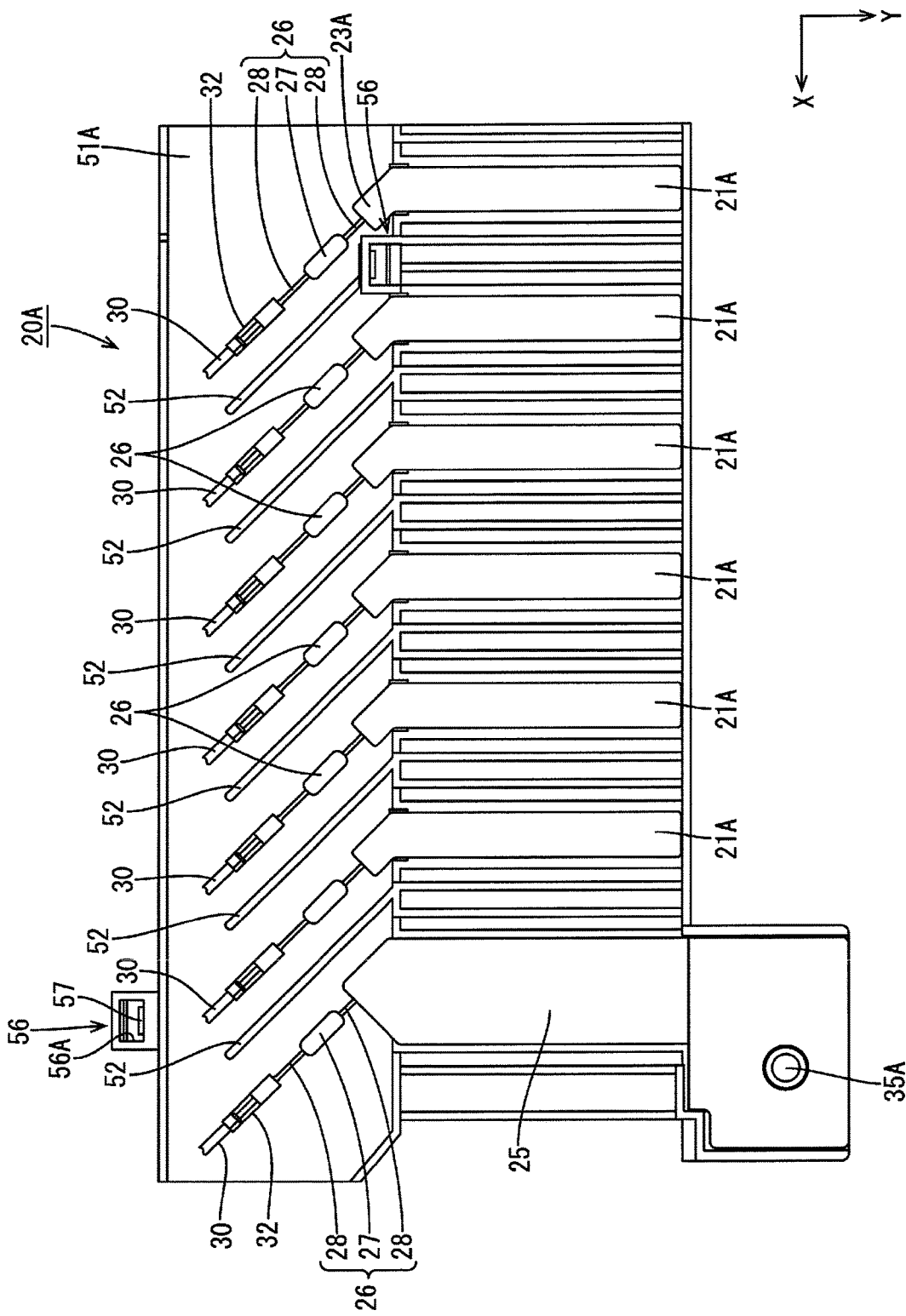
FIG. 12 is a plan view showing a first divided wiring module.

Each overcurrent protection element 26 is formed as an axial lead-type fuse, and includes, as shown in FIGS. 3 and 12, an element body 27, and a pair of lead portions 28 led out from opposite ends of the element body 27 in the central axis direction of the element body 27. The element body 27 includes, for example, a low-melting point alloy that couples the pair of lead portions 28 to each other, and an insulating synthetic resin case, a metal case, or a glass tube that covers the low-melting point alloy. The lead portions 28 extend linearly, and a tin-plated, annealed copper wire may be used for them. One of the lead portions 28 is connected to the connection portion 23A or 23B, for example, by resistance welding, ultrasonic welding, soldering, or the like, and the other lead portion 28 is crimped to a barrel portion of a splice terminal 32.

The splice terminal 32 includes a pair of barrel portions, and a plate-shaped coupling portion that couples the pair of tubular barrel portions to each other. With the lead portion 28 disposed on one of the barrel portions, and the conductor portion of the detection wire 30 disposed on the other barrel portion, the barrel portions are crimped by caulking using a crimping mold or the like, and, thereby, the overcurrent protection element 26 and the detection wire 30 are connected to each other by the splice terminal 32. Note that the shape of the splice terminal 32 is not limited to the shape described in the present embodiment, and it is possible to use splice terminals having various known shapes.

Detection Wire 30

The detection wire 30 is a wire to which a signal for detecting the voltage (state) of the electricity storage element 11 is sent, and is configured by covering the circumference of a conductor portion with an insulating coating (insulating layer). At the distal end portion, the insulating coating is removed so as to expose the conductor portion. The detection wire is connected to an external ECU (Electronic Control Unit), which is not shown. The ECU includes a microcomputer, an element, and the like that are mounted thereon, and has a well-known configuration having the functions for performing, for example, the detection of the voltage, the current, the temperature, and the like of the electricity storage element 11, and the charge/discharge control of the electricity storage element 11. In a state in which the detection wire 30 and the bus bar 21A or 21B are connected to each other by the overcurrent protection element 26 and the splice terminal 32, the axial direction of the overcurrent protection element 26 is a direction extending along the direction in which the connection portion 23A or 23B extends.

Insulating Protector 40

Figure 10:
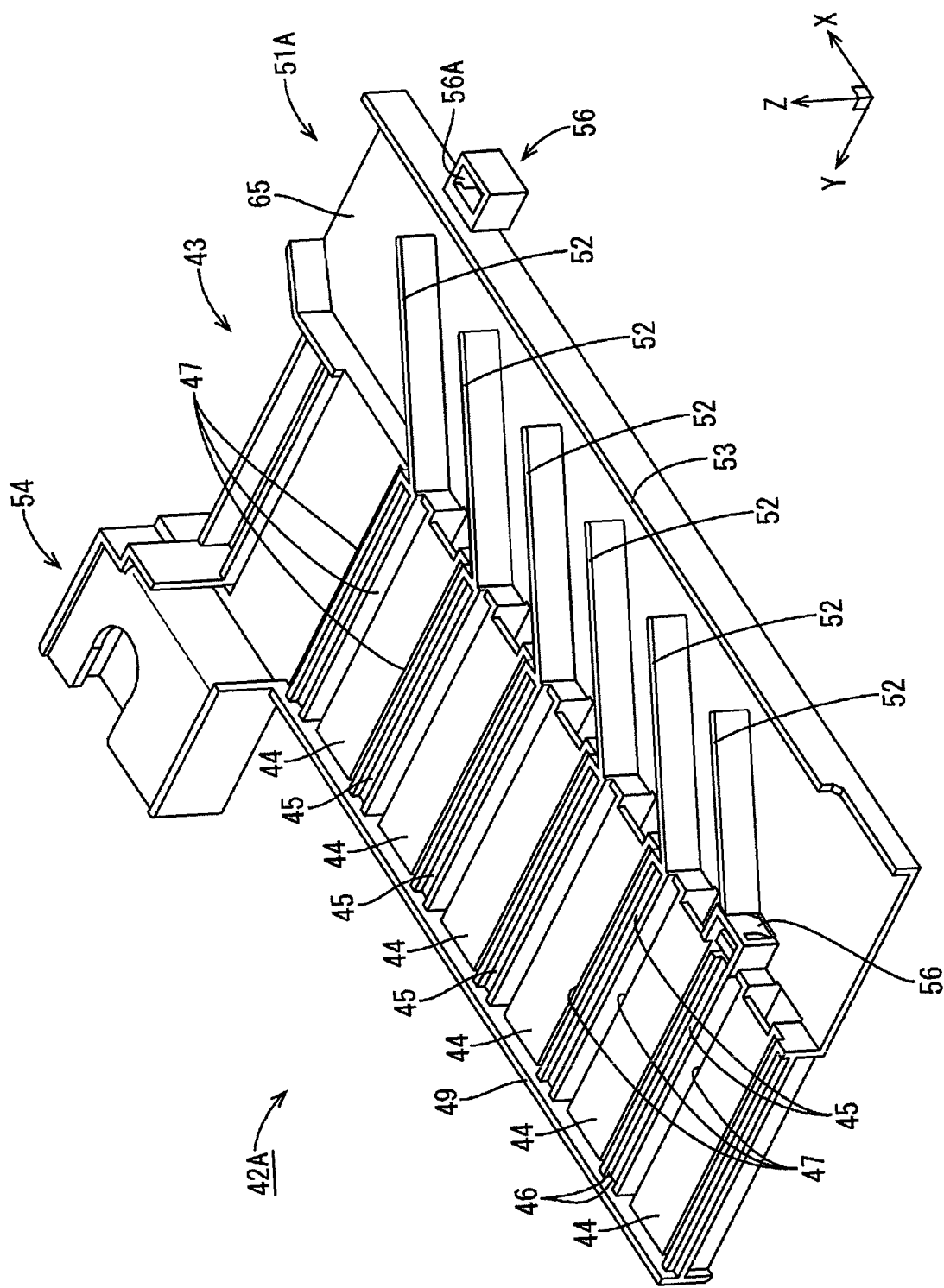
FIG. 10 is a perspective view showing a first unit.
Figure 11:
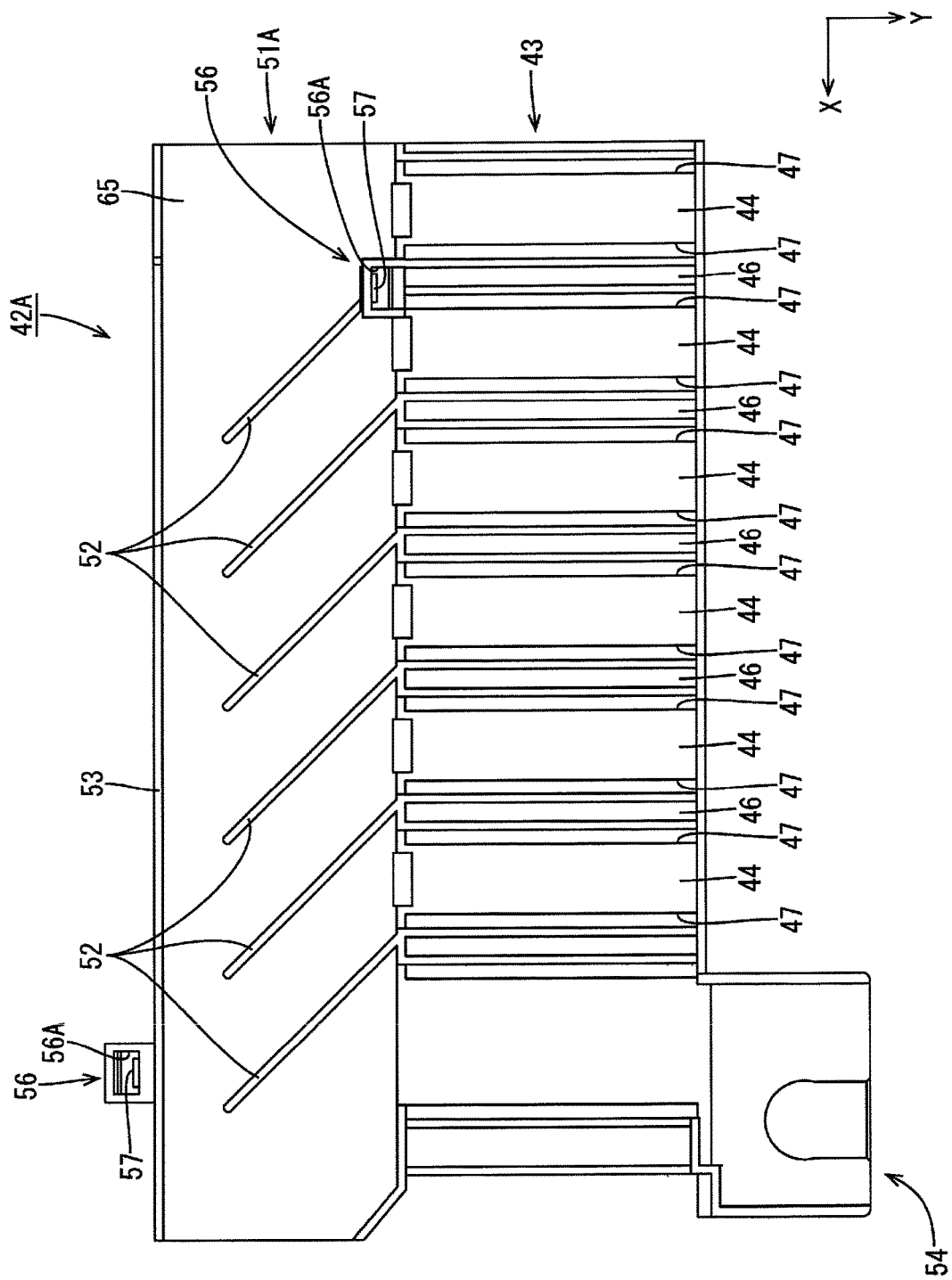
FIG. 11 is a plan view showing the first unit.
Figure 13:
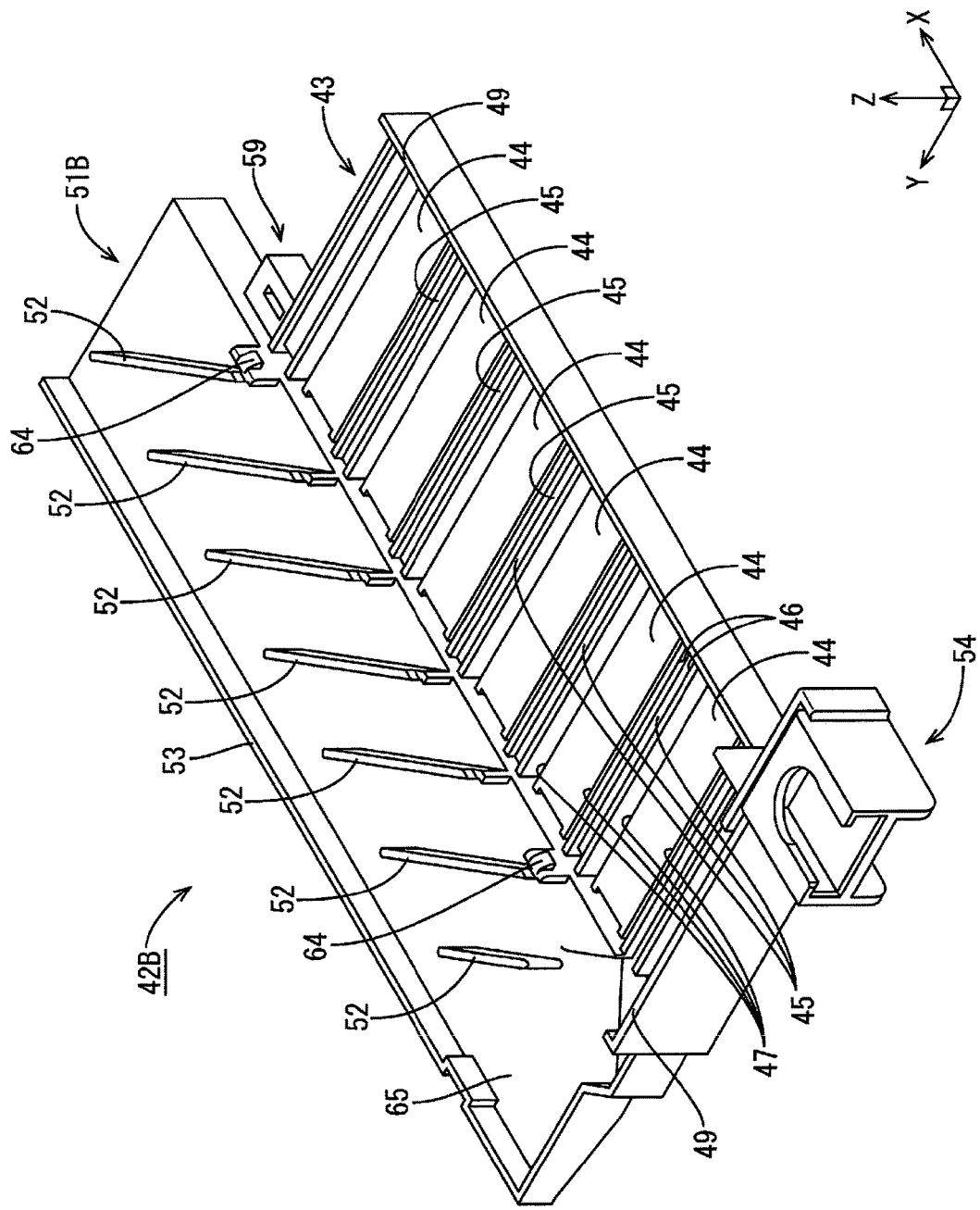
FIG. 13 is a perspective view showing a second unit.
Figure 14:
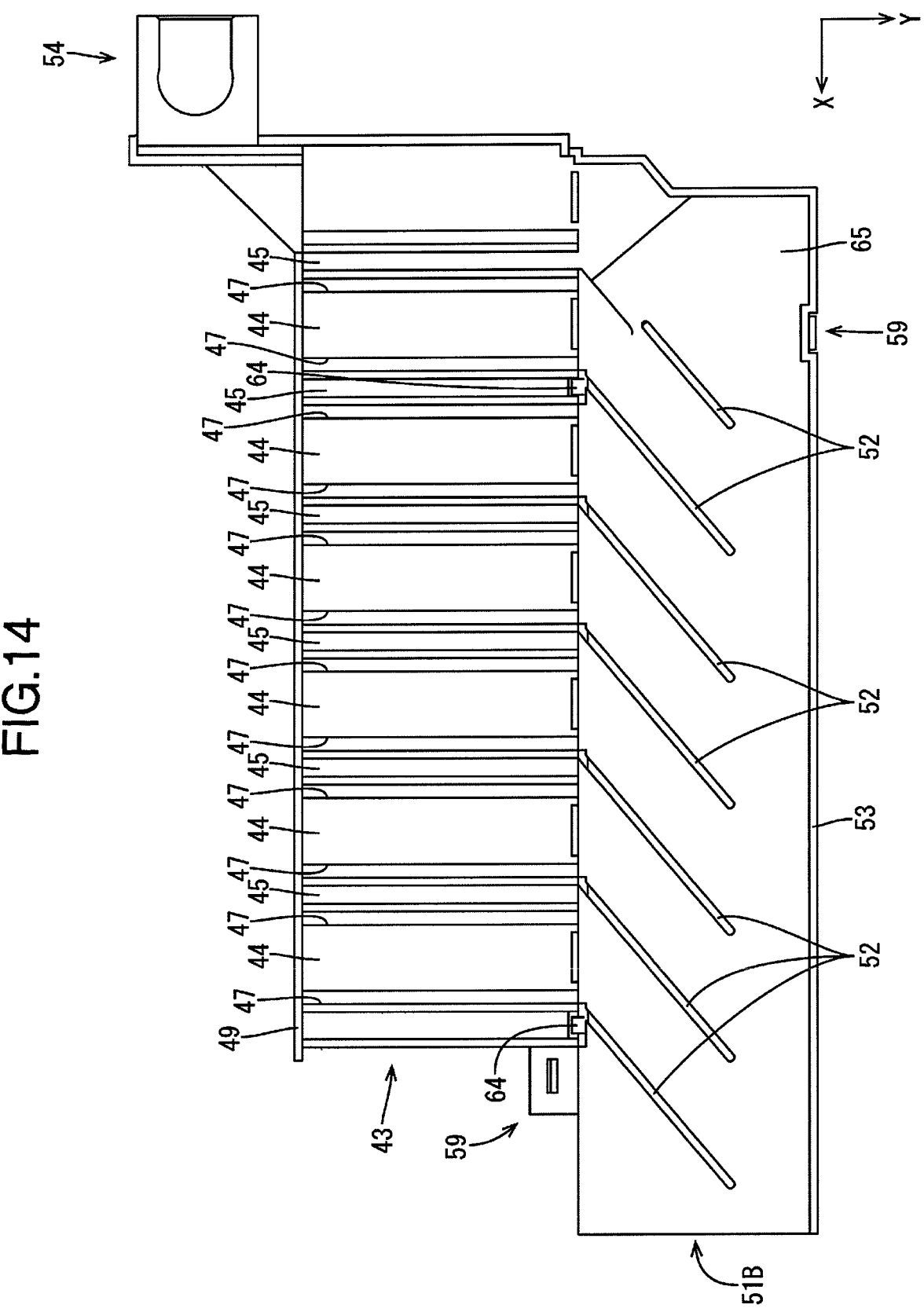
FIG. 14 is a plan view showing the second unit

The insulating protector 40 is made of an insulating synthetic resin, and is configured by combining and connecting a first unit 42A in which the plurality of first bus bars 21A are disposed, and a second unit 42B in which the plurality of second bus bars 21B are disposed, as shown in FIG. 2. As shown in FIGS. 10 and 13, each of the first unit 42A and the second unit 42B includes: a bus bar arrangement portion 43 in which the plurality of bus bars 21A (or bus bars 21B) are disposed; an extension portion 51A or 51B that is extended continuously with the bus bar arrangement portion 43 to a region different from the bus bar arrangement portion 43, and in which the overcurrent protection element 26 and the detection wire 30 are disposed; and an external connection portion 54 to which the external connection terminal 35A (or the external connection terminal 35B) is mounted.

Bus Bar Arrangement Portion 43

The bus bar arrangement portion 43 includes: a plurality of bus bar placement portions 44 on which the bus bars 21A (or the bus bars 21B) are placed; a partition wall 45 disposed between the adjacent bus bar placement portions 44; and a terminal insertion hole 47 formed therethrough between each of the bus bar placement portions 44 and each partition wall 45. The plurality of bus bar placement portions 44 are provided on the bus bar arrangement portion 43 so as to be arranged at equal intervals, are formed across the entire width of the bus bar arrangement portion 43, and each have a rectangular upper face serving as a flat placement surface, on which the inter-electrode conducting portion 22 can be placed. Each partition wall 45 is formed across the entire width of the bus bar arrangement portion 43, and has a groove 46 cut out on its upper face. Each terminal insertion hole 47 has a slit shape through which the electrode terminal 13A or 13B can be inserted, and is formed through the bus bar arrangement portion 43 according to the position of the corresponding electrode terminal 13A or 13B. An end wall 49 is erected at an outer end edge portion of the bus bar arrangement portion 43. Note that a removal restricting piece for restricting the removal of the bus bars 21A and 21B may be provided on an inner face or the like of the end wall 49.

Extension Portions 51A and 51B

Each of the extension portions 51A and 51B has a rectangular plate shape, and its upper face is formed as a flat placement surface 65 on which the overcurrent protection element 26 and the detection wire 30 are placed. A plurality of dividing walls 52 are erected side by side from the placement surface 65. Each of the dividing wall 52 has a plate shape, and extends in a direction inclined at a predetermined angle (in the present embodiment, approximately 45 degrees) relative to the X direction and the Y direction. An end wall 53 is erected from the placement surface 65 at an outer end edge portion of each of the extension portions 51A and 51B. When the detection wires 30 are disposed on the extension portion 51A or 51B, the detection wires 30 are bent inside the end wall 53 so as to be routed along the end wall 53, and are gathered on one side (the X-direction side) of the extension portions 51A or 51B (see FIG. 3. In FIG. 3 etc., only the distal end side of the detection wire 30 is shown, and the illustration of the other portions is omitted).

Here, regarding the height positions of the extension portions 51A and 51B relative to the bus bar arrangement portions 43, the placement surface 65 of the extension portion 51A is formed at a position lower than the upper face (the upper face of the bus bar placement portion 44) of the bus bar arrangement portion 43 for the first unit 42A, whereas the placement surface 65 of the extension portion 51B is formed at a position higher than the upper face (the upper face of the bus bar placement portion 44) of the bus bar arrangement portion 43 for the second unit 42B. Consequently, the extension portions 51A and 51B are vertically overlapped when the first unit 42A and the second unit 42B are combined.

Figure 5:
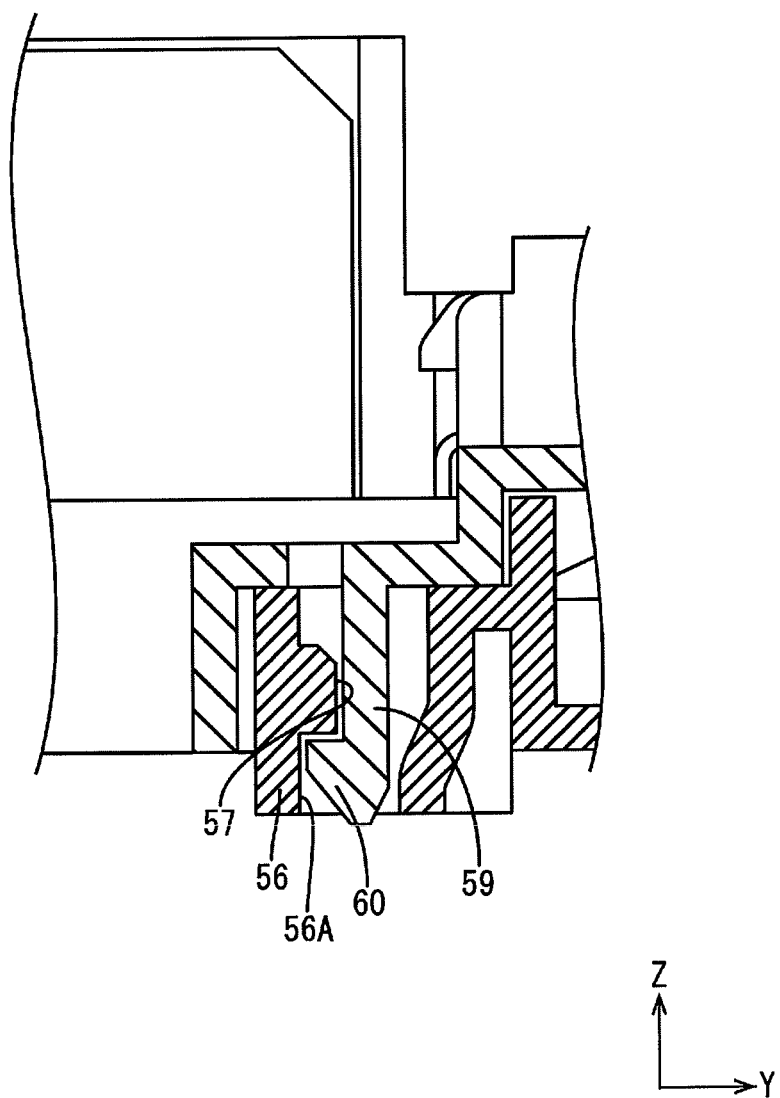
FIG. 5 is a cross-sectional view taken along the line B-B in FIG. 3.
Figure 6:
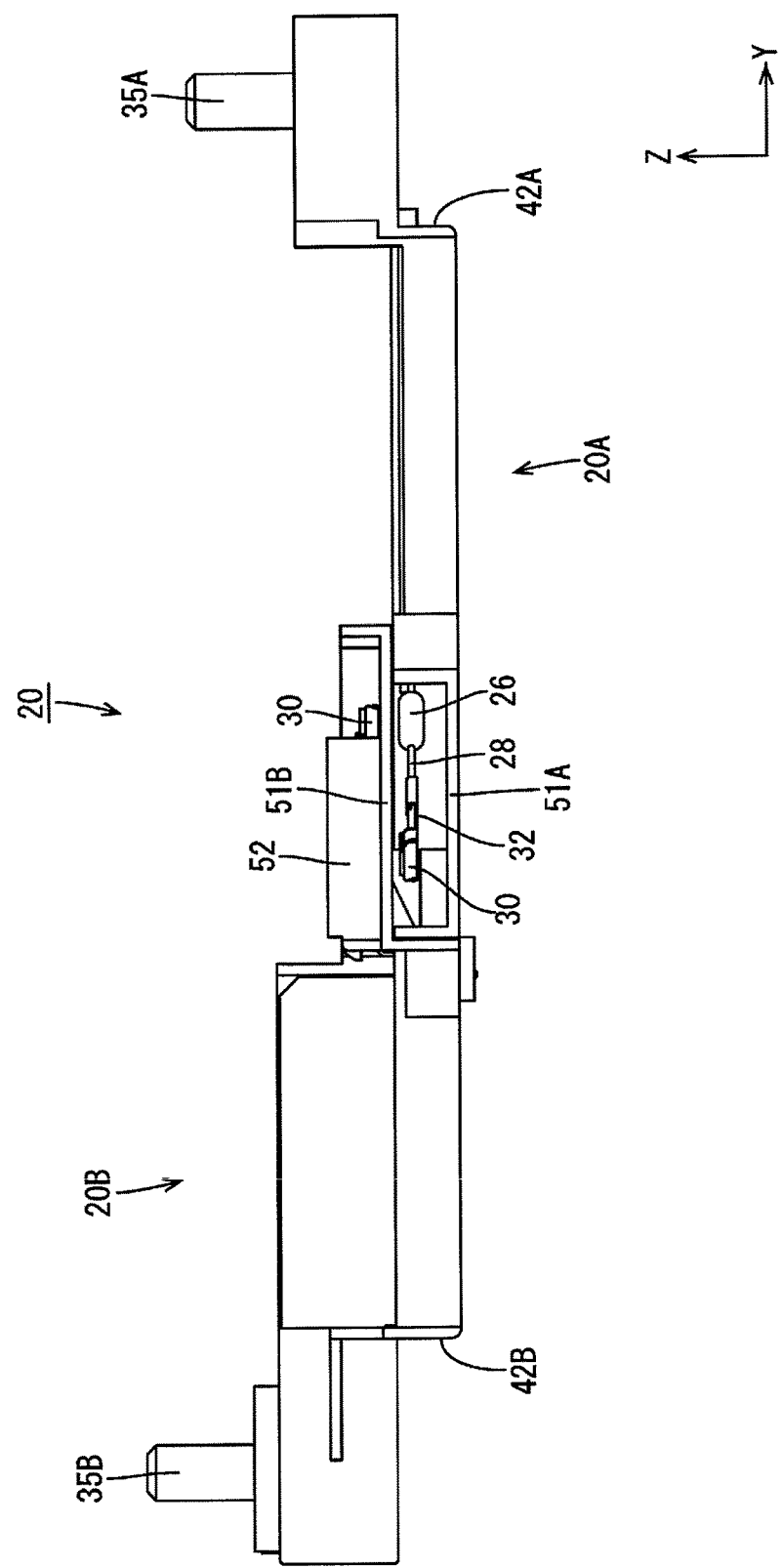
FIG. 6 is a left side view showing the wiring module.

A locked portion 56 is provided at each of the front and rear ends of the extension portion 51A of the first unit 42A, and a locking portion 59 for being locked to the corresponding locked portion 56 of the first unit 42A is provided at each of the front and rear ends of the extension portion 51B of the second unit 42B. As shown in FIG. 5, each of the locked portions 56 has a locking hole 56A formed therethrough in the vertical direction, and a locking projection 57 protruding from its inner wall. The locking portions 59 are each configured by forming a locking pawl 60 at the distal end portion of a bending piece capable of undergoing bending deformation. By the locking pawls 60 being locked at the lower end portions of the locking projections 57, the first unit 42A and the second unit 42B are retained in the assembled state.

The external connection portions 54 are provided at corners of the first unit 42A and the second unit 42B, and the rotation of the external connection terminals 35A and 35B is restricted by fitting the bolt-shaped external connection terminals 35A and 35B into the external connection portions 54.

As shown in FIG. 1, the extension portion 51B of the second unit 42B is covered by a cover 63. The cover 63 has a rectangular plate shape, and a frame-shaped cover locked portion 64 capable of undergoing bending deformation protrudes downwardly at the outer peripheral edge portion of the cover 63. By the cover locked portion 64 being locked to a cover locking portion 41A protruding on the extension portion 51B side, the cover 63 is retained in the closed state.

Next, the assembly of the wiring module 20 will be described.

The bus bars 21A and 21B with the overcurrent protection elements 26 and the detection wire 30 being connected to the connection portions 23A and 23B are attached to the first unit 42A and the second unit 42B, respectively, thus forming the first divided wiring module 20A (FIG. 12) and the second divided wiring module 20B.

Next, the extension portion 51B of the second divided wiring module 20B is stacked on the extension portion 51A of the first divided wiring module 20A, and the locked portions 56 are locked to the locking portions 59, thus forming the wiring module 20 (FIG. 2). The electrode terminals 13A and 13B of the plurality of electricity storage elements 11 are inserted through the terminal insertion holes 47 of the wiring module 20, and the electrode terminals 13A and 13B are, for example, welded together with the bus bars 21A and 21B, thus forming the electricity storage module 10.

According to the present embodiment, the following actions and effects can be achieved.

A wiring module 20 includes a plurality of bus bars 21A and 21B for connection to positive and negative electrode terminals 13A and 13B of a plurality of electricity storage elements 11; a plurality of detection wires 30 electrically connected the bus bars and 21B to detect a state of the electricity storage elements 11; a plurality of overcurrent protection elements 26 connected between the plurality of bus bars 21A and 21B and the plurality of detection wires 30; and an insulating protector 40 in which the plurality of bus bars 21A and 21B, the plurality of detection wires 30, and the plurality of overcurrent protection elements 26 are disposed, wherein the insulating protector 40 includes a bus bar arrangement portion 43 in which the bus bars 21A and 21B are disposed, and a plurality of extension portions 51A and 51B which are extended to a region different from the bus bar arrangement portion 43 and in which the overcurrent protection elements 26 are disposed, and the plurality of extension portions 51A and 51B are stacked in a plurality of levels.

According to the present embodiment, the plurality of overcurrent protection elements 26 are disposed in the plurality of extension portions 51A and 51B stacked in a plurality of levels. Accordingly, it is possible to reduce the area of the insulating protector 40 on the same plane as compared with a configuration in which all the overcurrent protection elements 26 are disposed on the same plane of the insulating protector 40. Consequently, even when the space on the plane is limited, for example, in a vehicle or the like, an extra space in the height direction (the direction orthogonal to the plane) can be effectively used to place the insulating protector 40. Since the area in which the insulating protector 40 is disposed is reduced in this manner, it is possible to reduce the size of the wiring module 20.

The overcurrent protection elements 26 are connected in a direction inclined relative to a direction orthogonal to a direction in which the bus bars 21A and 21B connect the electrode terminals 13A and 13B to each other.

With this configuration, it is possible to reduce the length of the insulating protector 40 for the direction orthogonal to the direction in which the bus bars 21A and 21B connect the electrode terminals 13A and 13B to each other, as compared with a configuration in which, for example, the overcurrent protection elements 26 are connected in the direction orthogonal to the direction in which the bus bars 21A and 21B connect the electrode terminals 13A and 13B to each other. Accordingly, it is possible to reduce the size of the wiring module 20.

The bus bars 21A and 21B each include an inter-electrode conducting portion 22 that electrically connects the electrode terminals 13A and 13B to each other, and a connection portion 23A or 23B for being connected to the corresponding overcurrent protection element 26, and the connection portion 23A or 23B extends in the direction inclined relative to the direction orthogonal to the direction in which the connection portion 23A or 23B connects the electrode terminals 13A and 13B to each other.

With this configuration, it is possible to easily perform connection between the bus bar 21A or 21B and the overcurrent protection element 26.

The insulating protector 40 is configured by combining a first unit 42A and a second unit 42B each including the bus bar arrangement portion 43 and the extension portion 51A (or the extension portion 51B).

With this configuration, the insulating protector 40 can be easily produced by forming the insulating protector 40 by combining the first unit 42A and the second unit 42B.

The insulating protector 40 includes a plurality of the bus bar arrangement portions 43 in different regions, and the extension portions 51A and 51B are disposed in a region between the plurality of bus bar arrangement portions 43.

With this configuration, the extension portions 51A and 51B can be gathered in a region between the plurality of bus bar arrangement portions 43.

Embodiment 2

Next, Embodiment 2 will be described with reference to FIGS. 15 to 18. Unlike in Embodiment 1, a cover 72 is connected to an extension portion 71 of a second unit 70B via a hinge portion 73 in Embodiment 2. The rest of the configuration is the same as that of Embodiment 1, and, therefore, the same components as those of Embodiment 1 are denoted by the same reference numerals, and the illustration thereof has been omitted.

Figure 15:
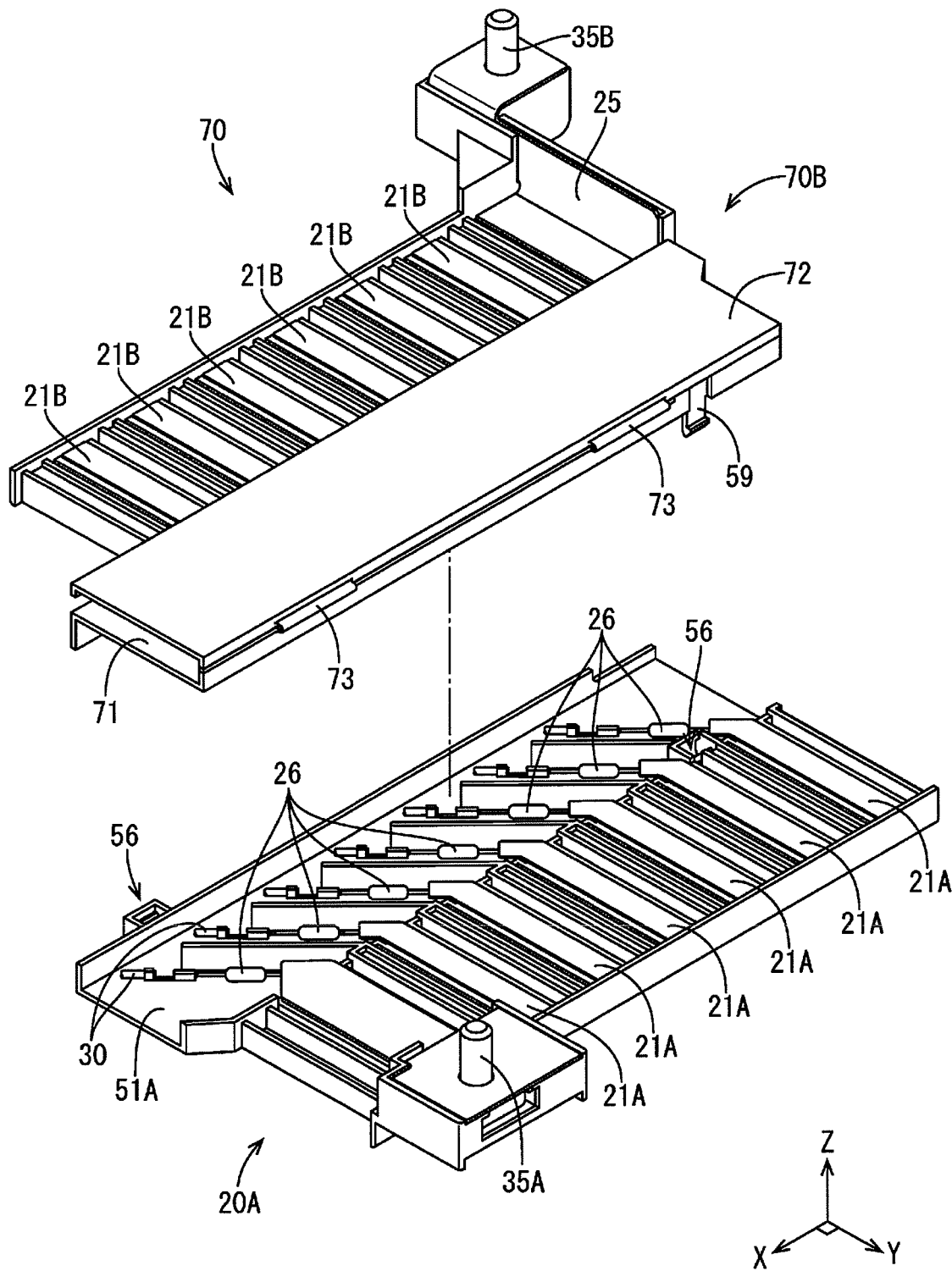
FIG. 15 is a perspective view showing a first divided wiring module and a second divided wiring module according to Embodiment 2.
Figure 16:
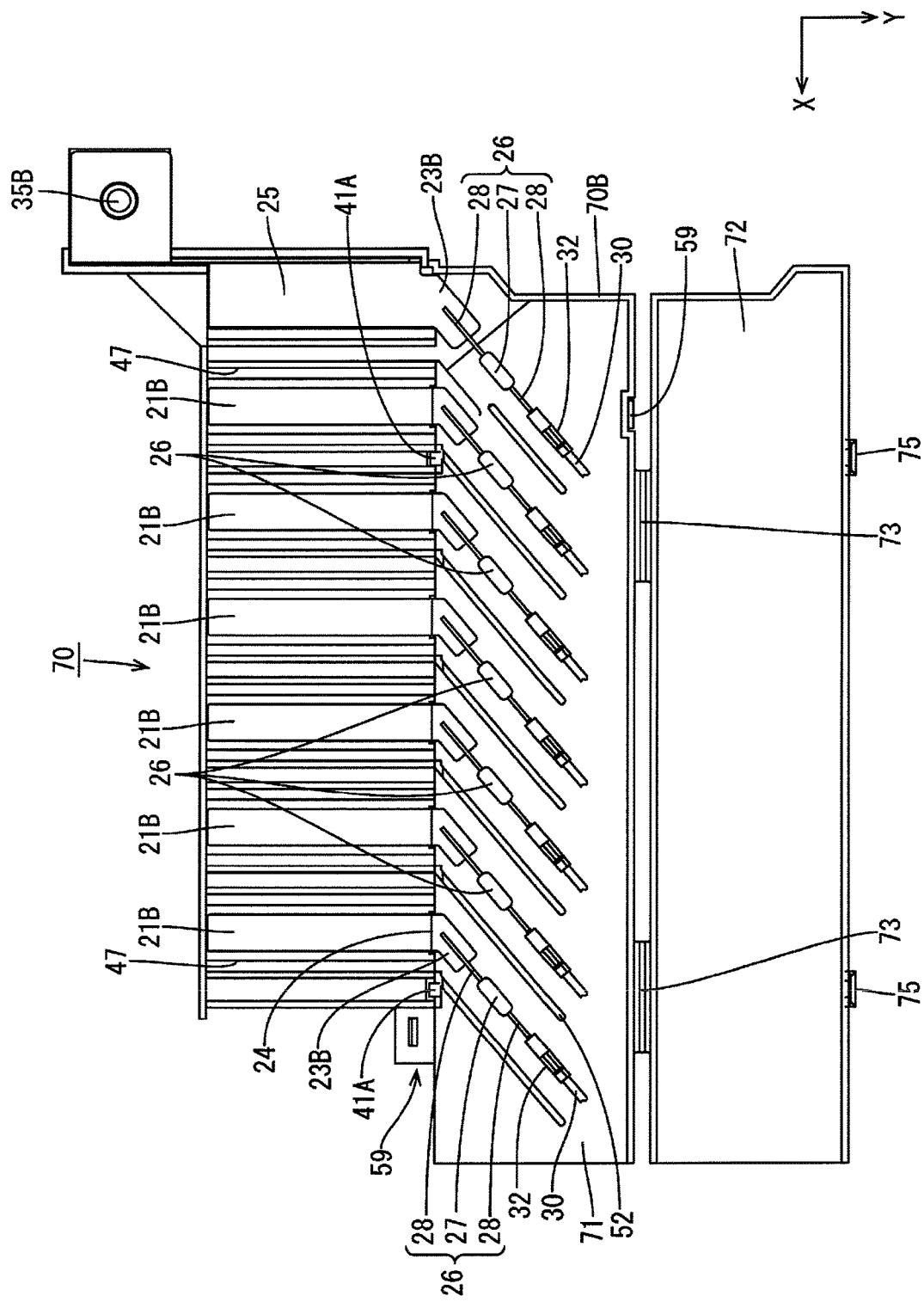
FIG. 16 is a plan view showing the second divided wiring module with a cover opened.
Figure 17:
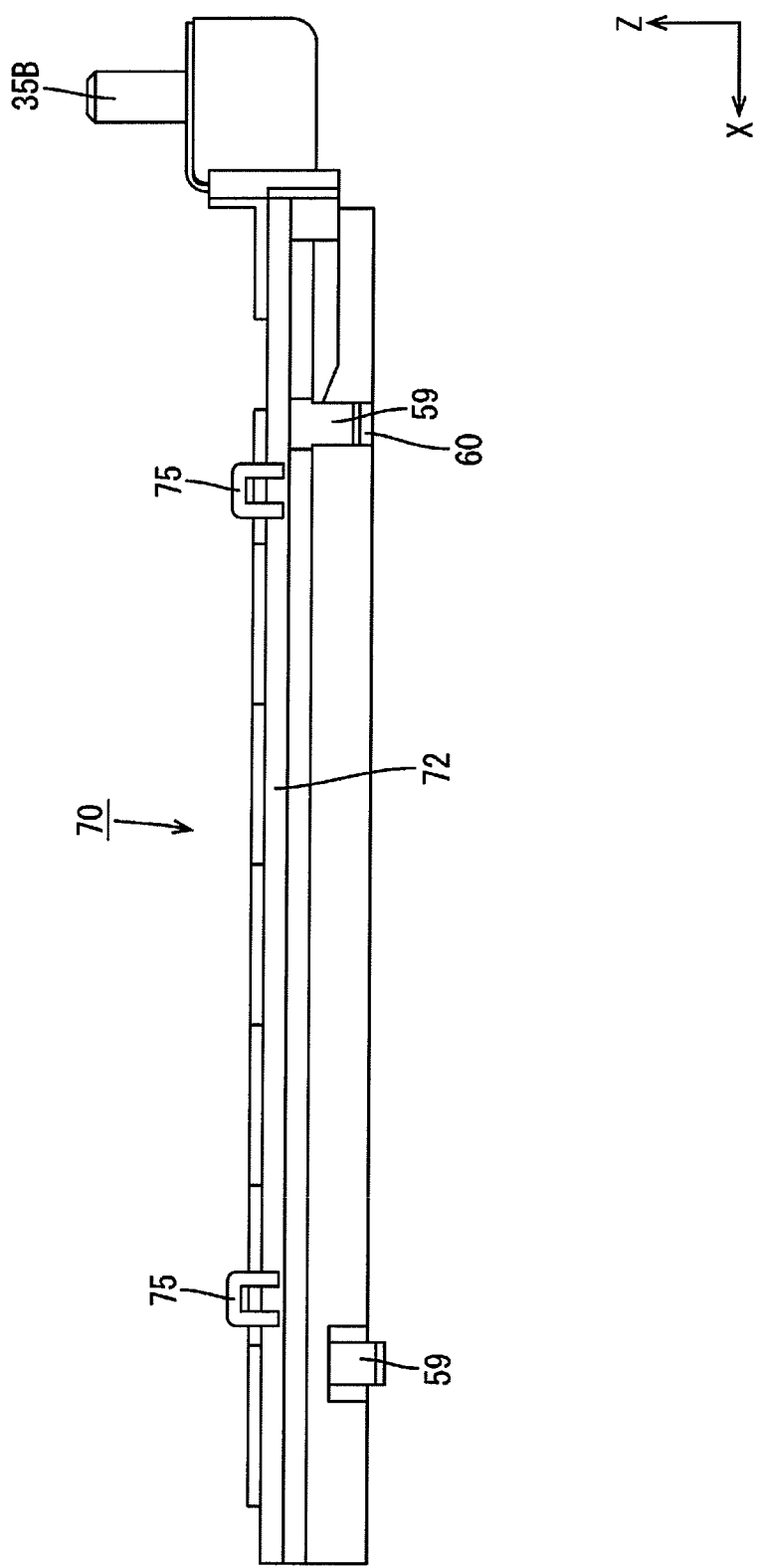
FIG. 17 is a front view showing the second divided wiring module with the cover opened.
Figure 18:
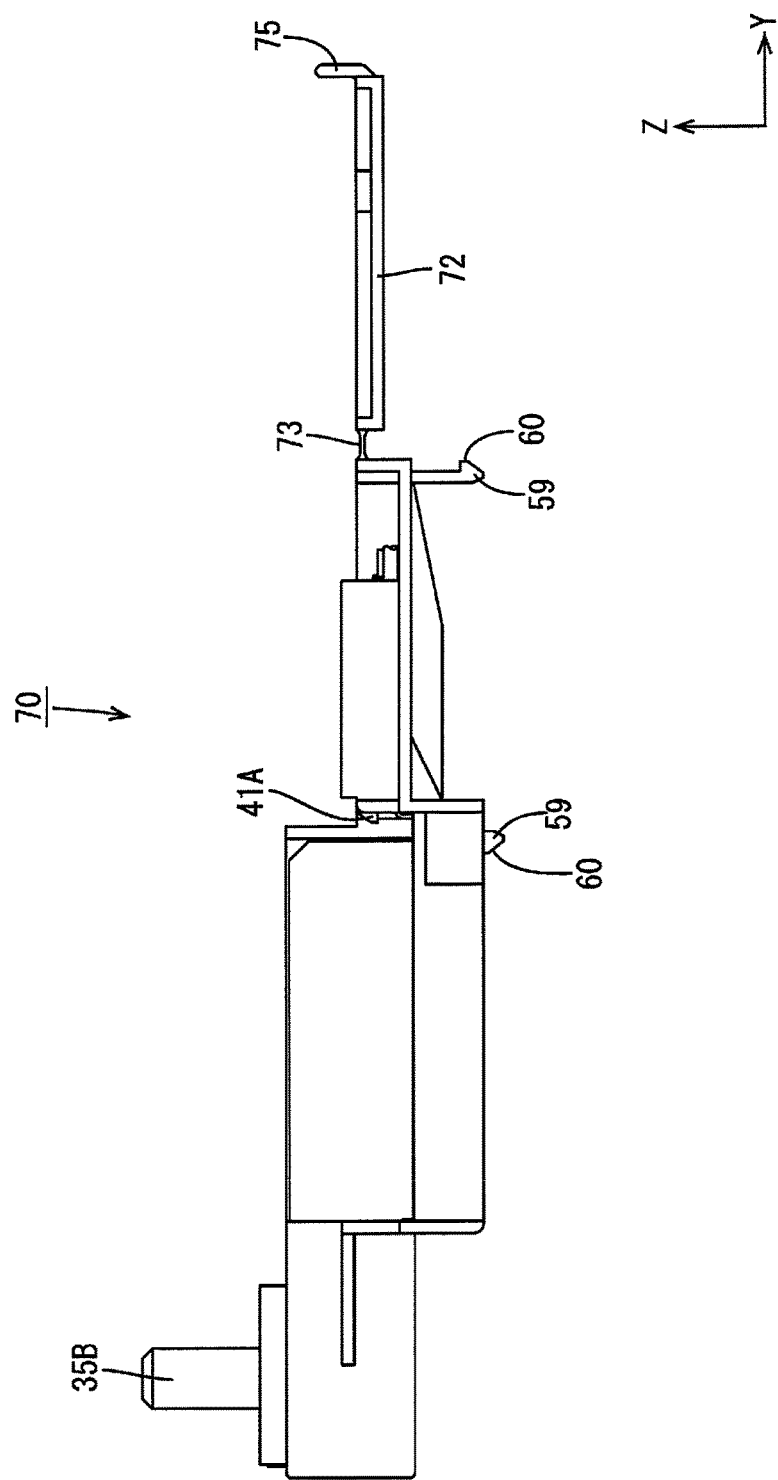
FIG. 18 is a left side view showing the second divided wiring module with a cover opened.

As shown in FIG. 15, a divided wiring module 70 includes a second unit 70B made of an insulating synthetic resin. A pair of hinge portions 73 are provided at the front end portion of an extension portion 71 of the second unit 70B, and the extension portion 71 and the cover 72 are connected to each other with the pair of hinge portions 73. Each hinge portion 73 has a belt shape having a thickness that allows bending deformation, and is formed integrally with the extension portion 71 and the cover 72. The cover 72 has a rectangular plate shape, and frame-shaped cover locked portions 75 capable of undergoing bending deformation are provided at an end edge of the over 72 on the side opposite to the hinge portions 73, as shown in FIGS. 16 and 17. By pivoting the cover 72 with the hinge portions 73 serving as an axis, the cover 72 is opened and closed relative to the extension portion 71. By the cover locked portions 75 being locked to cover locking portions 41A provided protruding on the extension portion 71 side, the cover 72 is retained in the closed state.

OTHER EMBODIMENTS

The technique described herein is not limited to the embodiments described and illustrated above. For example, the following embodiments are also included in the technical scope of the technique described herein.

(1) Although the extension portions 51A and 51B (71) are stacked in two levels in the above embodiments, the technique described herein is not limited thereto, and the extension portions 51A and 51B (71) may also be stacked in three or more levels.

(2) Although the wiring module is formed by combining the first unit 42A and the second unit 42B (70B) in the above embodiments, the technique described herein is not limited thereto, and an insulating protector in which the first unit 42A and the second unit 42B (70B) are formed integrally may also be used.

(3) The direction in which the overcurrent protection elements 26 are connected to the bus bars 21A and 21B is not limited to the direction described in the above embodiments. For example, the overcurrent protection elements 26 may also be connected in a direction orthogonal to the direction in which the bus bars 21A and 21B connect the electrode terminals 13A and 13B to each other. Also, the direction in which the connection portions 23A and 23B extend relative to the inter-electrode conducting portion 22 can be changed as appropriate according to the connection direction of the overcurrent protection element 26.

(4) Although the electricity storage element 11 in the above embodiments is a battery, the technique described herein is not limited thereto. The electricity storage element may also be a capacitor, for example.

(5) Although the overcurrent protection element 26 is a fuse in the above embodiments, the technique described herein is not limited thereto. The overcurrent protection element may also be, for example, a fusible link wire, a PTC thermistor, or the like. A fusible link wire is a wire for which a material that can be fused by application of overcurrent is used and in which the circumference of a stranded wire obtained by twisting together a large number of bare metal strands is surrounded by an insulating layer, and the stranded wire is exposed at the terminal end as a result of the insulating layer having been removed. As the material of the stranded wire, it is possible to use, for example, a copper-tin alloy, a zinc-aluminum alloy, or the like. The use of the fusible link wire as the overcurrent protection element allows the connection to the bus bar or the wire to be performed by crimping, thus making it possible to omit the resistance welding, ultrasonic welding, or soldering for connection to the bus bar and the like. Furthermore, the fusible link wire has flexibility that allows the wire to be easily bent, for example, thus making it possible to increase the degree of freedom of layout.

LIST OF REFERENCE NUMERALS

10 Electricity storage module
11 Electricity storage element
13A, 13B Electrode terminal
20 Wiring module
20A, 21B, 70 Divided wiring module
21A First bus bar (bus bar)
21B Second bus bar (bus bar)
22 Inter-electrode conducting portion
23A, 23B Connection portion
26 Overcurrent protection element
30 Detection wire
32 Splice terminal
40 Insulating protector
42A First unit
42B, 70B Second unit
43 Bus bar arrangement portion
51A, 51B, 71 Extension portion
56 Locked portion
59 Locking portion
63, 72 Cover
73 Hinge portion

The invention claimed is:

1. A wiring module comprising: a plurality of bus bars for connection to positive and negative electrode terminals of a plurality of electricity storage elements; a plurality of detection wires electrically connected the bus bars to detect a state of the electricity storage elements; a plurality of overcurrent protection elements connected between the plurality of bus bars and the plurality of detection wires; and an insulating protector in which the plurality of bus bars, the plurality of detection wires, and the plurality of overcurrent protection elements are disposed, wherein the insulating protector includes a bus bar arrangement portion in which the bus bars are disposed, and a plurality of extension portions which are extended to a region different than the bus bar arrangement portion and in which the overcurrent protection elements are disposed, and the plurality of extension portions are stacked in a plurality of levels;

and wherein the overcurrent protection elements are connected in a direction inclined relative to a direction orthogonal to a direction in which the bus bars connect the electrode terminals to each other.

2. The wiring module according to claim 1, wherein
the bus bars each include an inter-electrode conducting portion that electrically connects the electrode terminals to each other, and a connection portion for being connected to the corresponding overcurrent protection element, and
the connection portion extends in the direction inclined relative to the direction orthogonal to the direction in which the bus bars connect the electrode terminals to each other.

3. The wiring module according to claim 1, wherein
the insulating protector is configured by combining a first unit and a second unit which each include the bus bar arrangement portion and the corresponding extension portion.

4. The wiring module according to claim 1, wherein
the insulating protector includes a plurality of the bus bar arrangement portions in different regions, and the extension portions are disposed in a region between the plurality of bus bar arrangement portions.

* * * * *